Nov. 14, 1944.  T. F. BRACKETT  2,362,449
VARIABLE FEED MECHANISM
Filed Feb. 20, 1941  2 Sheets-Sheet 1

Inventor
Tracy F. Brackett
By Blackmor, Spencer & Flint
Attorneys

Nov. 14, 1944.   T. F. BRACKETT   2,362,449
VARIABLE FEED MECHANISM
Filed Feb. 20, 1941   2 Sheets-Sheet 2
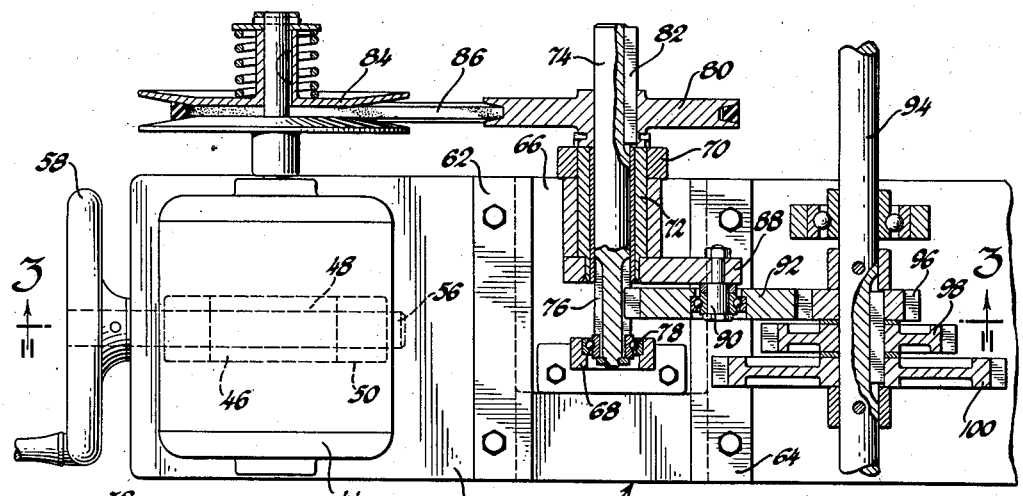
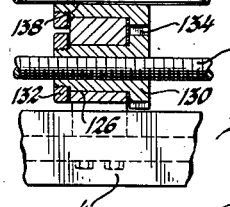
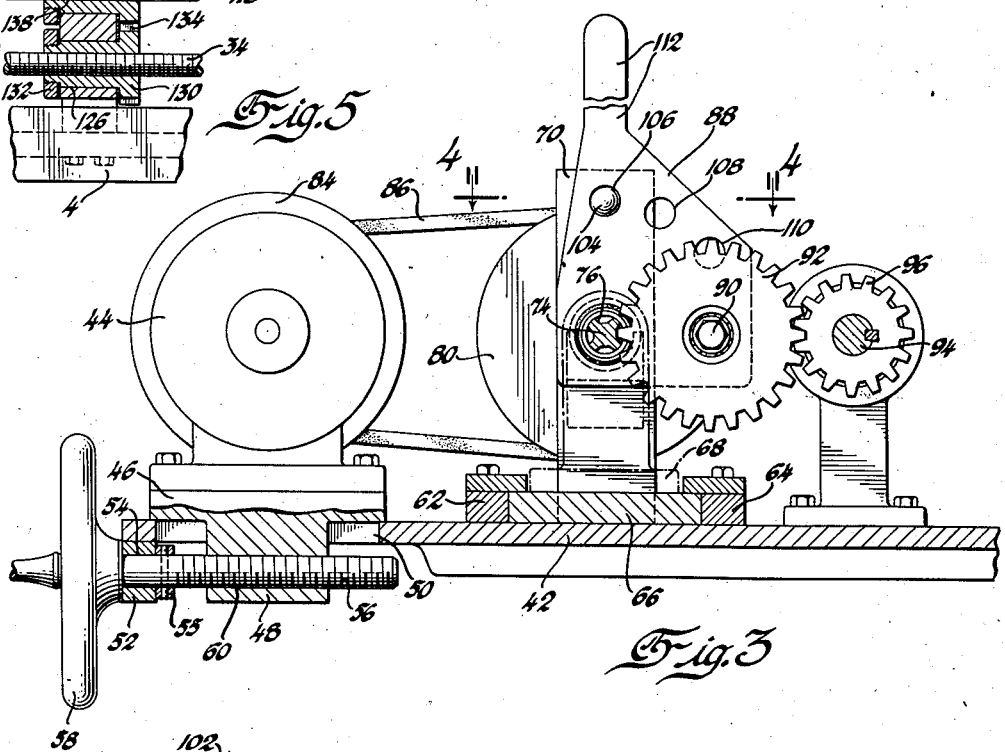
Inventor
Tracy F. Brackett
By Blackmore, Spencer & Flint
Attorneys Patented Nov. 14, 1944

2,362,449

UNITED STATES PATENT OFFICE 2,362,449

VARIABLE FEED MECHANISM

Tracy F. Brackett, Detroit, Mich., assignor to General Motors Corporation, Detroit, Mich., a corporation of Delaware Application February 20, 1941, Serial No. 379,775

11 Claims. (Cl. 90—13.5)

This invention relates to duplicating means and more specifically to driving means for moving tracer and cutting mechanisms in the reproducing of models. It is an improvement over and a continuation of my co-pending application Serial No. 156,644, filed July 31, 1937, entitled "Photo-cell control for die-sinking machine" which has become Patent Number 2,242,506, issued May 20, 1941.

In the former application a movable frame was disclosed which carried both the tracer head and the cutting means, the motion of which was controlled by the tracer head. Thus as the tracer was continuously driven along the surface of the master, the contour thereof caused the tracer to move either away from or toward the general plane of the surface, such action actuating switching means to cause a driving means to correct for such forcing and move the tracer head at right angles to the surface to cause it always to be in light contact therewith. This movement of the tracer head was simultaneously transmitted to the cutter head since they were both mounted upon the same movable member and thus the cutter head was caused to follow a similar contour and generate the surface.

The contour of the master model therefore would determine the distance that the corrective or drive mechanism would have to move the tracer head to keep it in contact. If there was a sudden change of curvature therefore it meant that the drive means would have to move the tracer a substantial distance at right angles to the surface in a short scanning distance in order to follow the necessary contour. When the scanning speeds are substantially slow, the corrective or drive mechanism would have a sufficient time to be able to move the tracer and cutter heads in and out with enough rapidity to generate the surface. However, since it is desired to reproduce these models with as great rapidity as possible, it is desired to increase the scanning speed as far as is reasonably possible. Therefore any change in contour must be corrected for with considerable rapidity.

It is therefore an object of the present invention to provide means controlled by an operator as an auxiliary source of correcting for the change in contour.

It is a further object of my invention to supply auxiliary driving means which may be set by an operator prior to the scanning by a tracer for a constant speed in addition to the ordinary corrections as called for by the tracer head.

It is a further object of my invention to provide such auxiliary drive as may be altered by the operator at any time during the scanning operation.

With these and other objects in view, the embodiments of my invention will be best understood by reference to the following specification and claims and the illustrations in the accompanying drawings, in which:

Figure 2 is a top detailed view partially in section showing the drive means of my invention;

Figure 3 is a vertical section taken on line 3—3 of Figure 2;

Figure 4 is a sectional view taken on line 4—4 of Figure 3; and

Figure 5 is an enlarged detailed section showing the specific drive means for the shaft.

Figure 1:
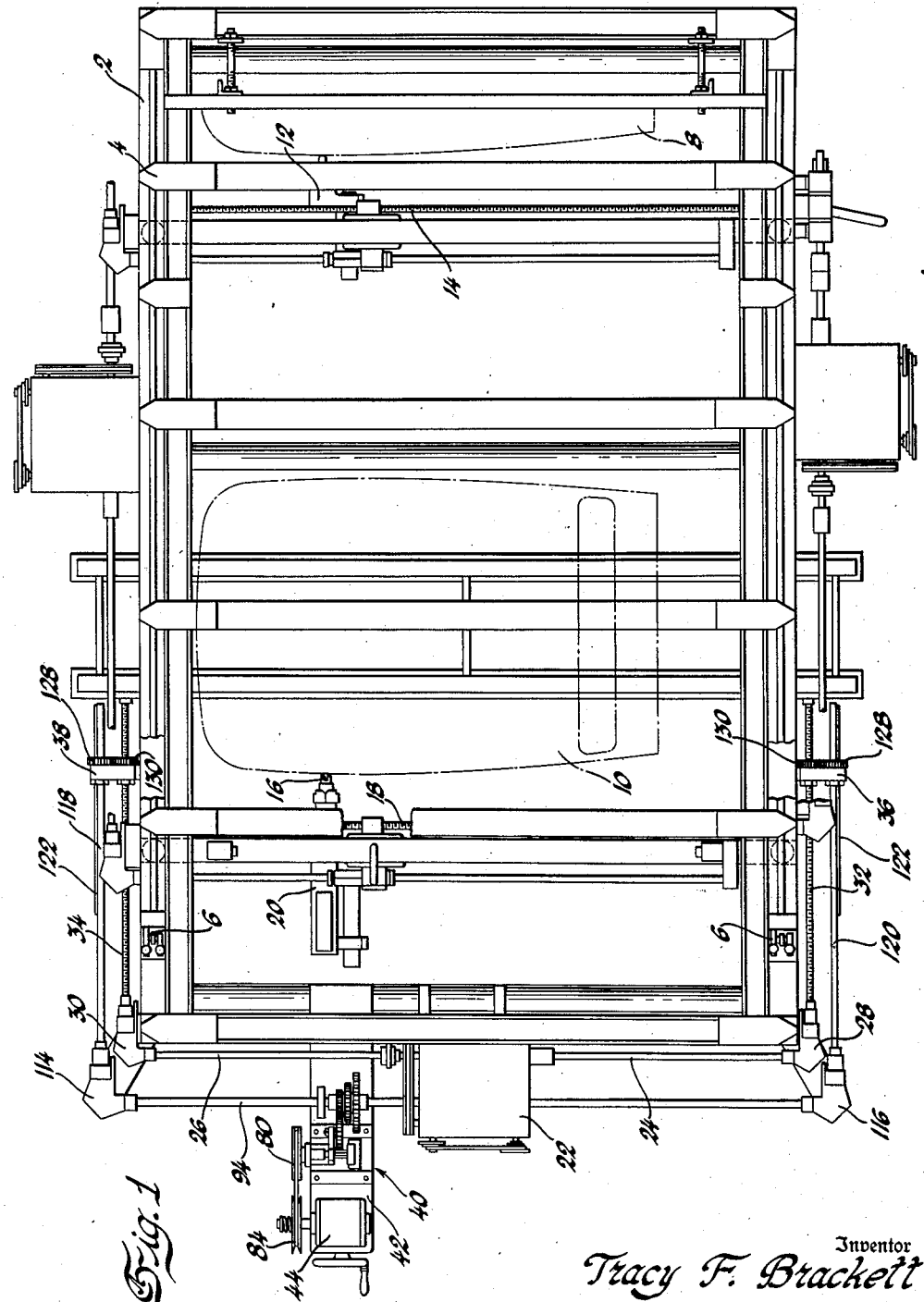
Figure 1 shows a top plan view of the device for reproducing a surface incorporating my invention.

Referring now more specifically to Figure 1, there is therein shown the same general type of surface reproducing mechanism as shown in the above identified Brackett application. Therein is illustrated a pair of frames 2 and 4, both of the rectangular box type, the latter being within the former and movable longitudinally with respect thereto on small rollers 6 provided at various points along the track. Thus the interior frame 4 may be moved back and forth on the stationary frame 2. Within the enclosure formed by this pair of frames there is mounted on the stationary frame 2 a blank 8 and a suitable model 10. A router or cutter means 12 is mounted on the movable frame 4 and provided with suitable driving mechanism such as 14 to be moved over the surface of the blank 8. There is also provided on the movable frame a tracer or follower head 16 adapted to be driven over the surface of the model 10 by similar drive means 18 driven from the same source as the drive means 14.

As the tracer head 16 is caused to move at right angles to the surface of the model as it is driven thereover by the scanning means, it energizes control means shown generally at 20 which operates a longitudinal force-applying means 22 to move the movable frame 4. All of this mechanism is fully described in my previous case and forms no part of the present invention. This driving means 22 when energized is connected to drive a pair of shafts 24 and 26 which through beveled gearing housed within means 28 and 30 rotate long threaded rods 32 and 34 which engage internally threaded members within housings 36 and 38 which are maintained against relative movement with respect to and rigidly secured to the movable frame 4. Thus any rotation of the two shafts 32 and 34 will bring a longitudinal force to bear upon the movable frame and cause it to move on the tracks within the stationary frame.

Thus as the tracer head scans the surface of the model 10 and its movement at right angles thereto causes the drive means 22 to rotate the shafts 24 and 26 in either direction, the movable frame will be moved back and forth to correct and maintain the tracer head 16 in light contact with the model surface and at the same time cause the cutter means 12 to generate the surface on the blank 8.

However, let us suppose that the surface of the model 10 changes very rapidly and in a short scanning distance the tracer 16 will be forced outwardly to quite an extent. The drive means 22 will then attempt to back away the tracer from the surface but its corrective efforts are only capable of a certain speed and since the scanning goes on at a constant speed perhaps will not be sufficient to take care of the correction desired. I therefore provide auxiliary control apparatus by which the speed of the movable frame back and forth may be altered or varied to take care of surfaces having large changes of contour or considerable curves therein.

This apparatus as will be seen is auxiliary to and an adjunct for the drive means 22. In other words, the normal corrective efforts of the tracer head will be applied to the traveling or movable frame through the drive means 22 but in addition to these it will be possible for the operator to apply either a constant speed to the movable frame or a variable speed as the necessity arises.

The apparatus for applying this additional effort is shown generally at 40 wherein there is shown a bracket 42 connected to the stationary frame upon one end of which is adjustably mounted a small motor 44 which is clamped to a base 46 having an extending lug 48 which projects through an opening 50 in the supporting plate 42. There is a flanged member 52 which extends downwardly from the end of the support 42 and which has an opening 54 therein which acts as a bearing for a threaded shaft 56 having rigidly secured to its outer end a hand wheel 58. The threaded portion of the rod 56 extends through an internally threaded opening 60 in the downwardly extending lug 48 of the base 46. Thus as the wheel is rotated the threaded rod will cause the base 46 to move inwardly or outwardly, depending upon the direction of rotation, and thus move the small control motor 44. The shaft 56 is prevented from longitudinal movement by a collar 55 pinned to the same.

Bolted to the base member 42 at a short distance from the motor 44 are two track members 62 and 64, a portion of which project toward each other overlying the top of a platform 66 to thus keep it in contact with the base but allow it to slide transversely across the same. This base is adapted to carry various drive mechanisms which will now be described. On one end of said base is rigidly mounted a bearing member 68 and on the opposite end is carried a vertical support 70 in which is mounted a bearing 72. These two bearings support a transverse shaft 74, the end of which is routed to form gear teeth 76, the outer end being supported in a ball bearing assembly 78 carried by the bearing member 68 and the opposite end carrying a pulley 80 splined to the shaft by spline 82 but capable of moving axially thereon.

The small motor 44 has mounted upon its shaft a variable sized pulley 84 which drives by belt 86 the pulley 80 mounted on the shaft 74. As the motor is moved by the hand wheel, the size of pulley 84 will change, thus changing the speed of the drive. Also carried on the bearing member 72 is an angular plate 88 which is rotatable about the axis of the shaft 74, said plate carrying on one of its extending portions a small stub shaft 90 which supports a transfer gear 92. Also mounted in suitable bearing structure on the base 42 is a long shaft 94 on which are mounted a series of gears 96, 98 and 100 of different diameters.

Carried by the vertical support means 70 is a spring biased plunger 102 having a projecting tip 104 adapted to cooperate with certain openings 106, 108 and 110 which support the plate 88 in any one of three angular positions to enable the transfer gear 92 to engage any of the gears 96, 98 or 100, depending upon which ratio is desired. If it is desired to change from one to another the handle portion 112 is moved to the position desired and the plunger 104 allowed to contact the opening to maintain it in that position, the base 66 being slidable transversely to allow the engagement of the gear 92 with the gear 98 or 100. When this occurs the pulley 80 may be slid along the outer end of the shaft 74 to align it with the pulley 84 to maintain drive.

Whatever power is therefore applied to the long shaft 94 is transmitted to certain beveled gears 114 and 116 on opposite sides of the frame and then to longitudinal shafts 118 and 120, respectively. These two last-mentioned shafts have long keyways cut therein in which keys 122 are inserted and project into assemblies best shown in Figure 5. The stationary brackets 36 and 38 are identical and therefore only one will be described and as shown the outer housing 38 has two longitudinal parallel cylindrical openings 124 and 126 cut therein in which are mounted two bushings 128 and 130. The last-named bushing is internally threaded and houses one end of the threaded shaft 34 and is maintained in its position by a small nut 132 which maintains it in the support 38 but does not prevent its rotation with respect thereto. The opposite end of said member 130 has gear teeth 134 cut therein which are adapted to engage and mesh with teeth 136 on the end of the cylindrical bushing member 128 so that any rotation of one causes the other to rotate. The member 128 has a circular opening 138 cut therein and also a groove to house the shaft 118 and its key 122. It is also supported on the support 38 in the same manner as the lower member 130.

If the auxiliary keyed shaft 118 is not rotated at all, the bushing 130 will not rotate, but will be locked and therefore will act solely as a traveling nut on the threaded shaft 34 and will move axially thereon as the shaft is rotated with the resultant movement of the movable frame 4 due only to the drive motor 22. Any rotation of the shaft 118 is therefore supplementary and adds or subtracts from the steady movement of the frame 4 from motor 22 by varying the effect of the bushing 130 as a traveling nut since any rotation of the bushing itself would cause axial movement of the same, and therefore its housing, along the threaded shaft.

It will thus be seen that any rotation of the shaft 118 will be transmitted to the rotatable bushing 130 through the geared connection of the two cylindrical bushing members to force the movable frame 4 in either direction, depending on the direction of rotation. Thus if the shaft 34 is rotating at a given speed and the auxiliary shaft 94 is also being rotated, this latter amount of rotation is algebraically added to the effect of that of shaft 34 through this geared connection and causes additional movement of the bracket 38 and the frame 4 on which it is mounted. In this manner an operator controlling both the gear ratio between gears 92, 96, 98 and 100 and the position of the adjustable pulley, can determine by looking at the contour of the model to be reproduced the approximate speed with which the tracer head will have to move to follow the contour and may therefore set a definite speed before the tracer is moved in a scanning manner over the model and any additional corrections may therefore be taken care of by the shaft 26 and driving means 22 rather than having the whole duty of correcting fall upon this latter driving means. Any sudden change may be accommodated by the hand wheel adjustment. In this way I provide much higher scanning speeds and reproduce models in a much shorter time; speeds of one foot per minute in scanning distance and even greater have been attained.

I claim:

1. In model reproducing mechanism, a movable means, tracing and cutting means mounted on said movable means, driving means for moving said movable means controlled by the tracing means and superposed auxiliary driving means connected to simultaneously drive the movable means.

2. In model reproducing mechanism, a stationary frame, a model and a blank support mounted in the frame, a movable frame mounted in juxtaposition to the first, tracing means and cutting means mounted on the moving frame adjacent the model and blank respectively, means connected to the movable means to drive the same controlled by the tracing means, and superposed auxiliary driving means manually controlled for simultaneously driving the movable frame.

3. In model reproducing mechanism, a stationary base, a model and a blank support mounted thereon, a member movable with respect to said base, a tracer head and a cutter mounted thereon in juxtaposition to the model and blank respectively, driving means to move said movable member controlled by said tracer head to maintain said tracer head always in light contact with the model surface and superposed auxiliary driving means for the movable member manually controlled to provide simultaneously extra drive for large contour changes.

4. In model reproducing mechanism, a stationary frame, a model and a blank support mounted in the frame, a movable frame mounted in juxtaposition to the first, tracing means and cutting means mounted on the moving frame adjacent the model and blank respectively, means connected to the movable means to drive the same controlled by the tracing means, superposed auxiliary driving means manually controlled for simultaneously driving the movable frame, and means for varying the speed of the auxiliary drive.

5. In model reproducing mechanism, a stationary base, a model and a blank support mounted thereon in spaced relation, a member movable with respect to the base, a tracer and a cutter mounted on the movable member in juxtaposition to the model and blank respectively, driving means for moving said movable member, control means for said driving means operated by the tracer to move the member as determined by the model and tracer, a second superposed driving means to simultaneously move the movable member comprising a motor, a variable speed pulley connected to the motor, a variable speed transmission driven by the pulley and driving elements interconnecting said transmission with said movable means whereby a large range of speeds may be applied to the movable means.

6. In model reproducing mechanism having a tracer controlled movable member, a superposed manually adjustable auxiliary drive for varying the basic movement of the movable member whereby contour changes may be accommodated at high speeds.

7. In model reproducing mechanism having a tracer head controlled movable member carrying a cutter, a superposed variable auxiliary drive for varying the basic movement of the movable member demanded by the tracer head, means for manually setting the speed of the auxiliary drive before starting the mechanism and further means for manually adjusting the speed during operation whereby high scanning speeds are achieved.

8. In model reproducing mechanism, a stationary base, a model and a blank support mounted thereon in spaced relation, a member movable with respect to the base, a tracer head and cutter mounted on the movable member in juxtaposition to the model and blank respectively, threaded means mounted on the movable member, a rotatable threaded shaft extending therethrough, means for rotating the shaft controlled by the tracer head whereby the threaded means and the movable means will be moved and a second independent driving means to rotate the threaded means to vary the driving action of the first driving means and therefore the movement of the movable means.

9. In model reproducing mechanism, a stationary base, a model and a blank support mounted thereon in spaced relation, a member movable with respect to the base, a tracer head and cutter mounted on the movable member in juxtaposition to the model and blank respectively, a bracket mounted on the movable member, a hollow threaded bushing rotatably mounted in the bracket, a rotatable threaded shaft extending through the bushing, means for rotating the shaft controlled by the tracer head, and independent means to rotate the bushing at predetermined speeds to vary the driving action of the bushing.

10. In model reproducing mechanism, a stationary base, a model and a blank support mounted thereon in spaced relation, a member movable with respect to the base, a tracer head and cutter mounted on the movable member in juxtaposition to the model and blank respectively, a bracket mounted on the movable member, a hollow threaded bushing rotatably mounted in the bracket, a rotatable threaded shaft extending through the bushing, means for rotating the shaft controlled by the tracer head, a second rotatable bushing mounted in the bracket, interconnecting gearing means on the two bushings whereby rotation of the second bushing will cause the first to rotate and independent means for driving the second bushing.

11. In model reproducing mechanism, a stationary base, a model and a blank support mounted thereon in spaced relation, a member movable with respect to the base, a tracer head and cutter mounted on the movable member in juxtaposition to the model and blank respectively, a bracket mounted on the movable member, a hollow threaded bushing rotatably mounted in the bracket, a rotatable threaded shaft extending through the bushing, means for rotating the shaft controlled by the tracer head, a second rotatable bushing mounted in the bracket, interconnecting gearing means on the two bushings whereby rotation of the second bushing will cause the first to rotate and independent means for driving the second bushing at a plurality of predetermined speeds.

TRACY F. BRACKETT.